United States Patent
Granite et al.

(10) Patent No.: US 8,071,500 B1
(45) Date of Patent: Dec. 6, 2011

(54) THIEF CARBON CATALYST FOR OXIDATION OF MERCURY IN EFFLUENT STREAM

(75) Inventors: Evan J. Granite, Wexford, PA (US); Henry W. Pennline, Bethel Park, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 12/835,204

(22) Filed: Jul. 13, 2010

Related U.S. Application Data

(63) Continuation-in-part of application No. 11/183,221, filed on Jul. 14, 2005, now Pat. No. 7,776,780.

(51) Int. Cl.
*B01J 21/18* (2006.01)
*B01J 27/06* (2006.01)
*B01J 20/00* (2006.01)

(52) U.S. Cl. ........... 502/180; 502/181; 502/400; 95/901

(58) Field of Classification Search .................. 502/180, 502/181, 400; 95/901
See application file for complete search history.

(56) References Cited

U.S. PATENT DOCUMENTS

| | | | | |
|---|---|---|---|---|
| 5,438,029 A | * | 8/1995 | Kobata et al. | 502/430 |
| 6,103,205 A | * | 8/2000 | Wojtowicz et al. | 423/210 |
| 6,521,021 B1 | * | 2/2003 | Pennline et al. | 95/134 |
| 6,953,494 B2 | * | 10/2005 | Nelson, Jr. | 95/134 |
| 7,033,419 B1 | * | 4/2006 | Granite et al. | 95/134 |
| 7,199,080 B2 | * | 4/2007 | Freel et al. | 502/423 |
| 2005/0274307 A1 | * | 12/2005 | Lissianski et al. | 110/345 |

* cited by examiner

*Primary Examiner* — Cam N. Nguyen
(74) *Attorney, Agent, or Firm* — Mark C. Lang; Bradley L. Smith; John T. Lucas

(57) ABSTRACT

A catalyst for the oxidation of heavy metal contaminants, especially mercury (Hg), in an effluent stream is presented. The catalyst facilitates removal of mercury through the oxidation of elemental Hg into mercury (II) moieties. The active component of the catalyst is partially combusted coal, or "Thief" carbon, which can be pre-treated with a halogen. An untreated Thief carbon catalyst can be self-promoting in the presence of an effluent gas streams entrained with a halogen.

11 Claims, No Drawings

THIEF CARBON CATALYST FOR OXIDATION OF MERCURY IN EFFLUENT STREAM

RELATED APPLICATIONS

This application is a continuation-in-part of and claims the benefit of U.S. Ser. No. 11/183,221, filed on Jul. 14, 2005, and entitled, "Catalysts for Oxidation of Mercury in Flue Gas," now U.S. Pat. No. 7,776,780, which is hereby incorporated by reference in its entirety.

GOVERNMENT INTERESTS

The United States Government has rights in this invention pursuant to the employer-employee relationship between the Government and the inventors who are U.S. Department of Energy employees at the National Energy Technology Laboratory, Pittsburgh, Pa.

FIELD OF THE INVENTION

This invention relates to a catalyst for oxidation of one or more heavy metals from an effluent stream, and more specifically, this invention relates to a partially combusted coal catalyst for the oxidation of heavy metals, such as mercury (Hg), from high temperature gas streams generated from sources such as coal gasifiers, coal-fired electrical generating plants, ore smelters, oil- or petroleum residue-fired combustors, and various waste incinerators.

BACKGROUND

Certain effluent gas streams contain many toxic pollutants, including the heavy metals mercury and cadmium. Coal-burning power plants, incinerators, oil-burning boilers and power plants, refuse-derived fuel power plants, and gasification systems (especially integrated gasification combined cycle power generation systems) are sources of effluent streams with mercury and other heavy metals. The combustion of low-rank coals, such as Powder River Basin sub-bituminous coal and lignites, has been shown to form flue gases where the mercury is primarily in the elemental form. Indeed, much of the mercury contained in power plant flue gas is in the elemental form. Elemental mercury is a semi-noble metal, insoluble in water, and is not efficiently captured by carbon. As such, elemental mercury is difficult to capture while oxidized mercury is more amenable to capture.

Mercury compounds, such as mercury (II) chloride, $HgCl_2$, are highly soluble in water and more readily removed by carbon sorbents. Therefore, agents that can oxidize elemental mercury to mercury (II) chloride (or another oxidized mercury compound) would be of considerable value in effluent clean-up. Such agents would enable mercury to be captured by existing air pollution control devices (APCDs) present at coal-burning power plants. Typical APCDs include wet and dry scrubbers for acid gas removal ($SO_x$ and $NO_x$), as well as electrostatic precipitators (ESPs) and baghouse filters for particulate removal.

Ideally, the mercury oxidation catalysts would be located upstream of the appropriate APCD. Mercury (II) chloride is readily removed by the scrubbing solutions employed for acid gas removal and/or by adsorption on unburned carbon in fly ash captured by ESPs or baghouse filters. Mercury (II) chloride is also sequestered by activated carbon sorbents injected upstream of an ESP or baghouse.

Many technologies are being developed for the control of mercury emissions from flue gases. These methods employ sorbents, catalysts, scrubbing liquors, flue gas or coal additives, combustion modifications, barrier discharges, and ultraviolet (UV) radiation. Efforts have been made to develop catalysts for selectively oxidizing elemental mercury in effluent streams. However, these selective catalytic reduction (SCR) catalysts, whose primary role in flue gas is the reduction of nitrogen oxides, typically achieve only 50 percent oxidation levels for mercury oxidation. SCR catalysts have not yet been optimized for mercury oxidation and removal.

Due to its relative simplicity and proven successful application for the incinerator market, most of the research has focused upon the use of activated carbon sorbents for the adsorption of mercury.

Gold (Au) and palladium (Pd) catalysts are used as mercury oxidation catalysts. For example, U.S. Pat. No. 6,136,281 awarded to Meischen, et al. on Oct. 24, 2000, discloses a gold catalyst for the oxidation of elemental Hg in effluent gas streams. However, both Au and Pd catalysts are not inert and therefore degrade in flue gases.

Thief carbons and their adsorption capabilities are described in U.S. Pat. No. 6,521,021 awarded to Pennline, et al., on Feb. 18, 2003, which is incorporated in its entirety by reference herein.

None of the aforementioned patents discloses catalysts with both high mercury oxidation levels and high adsorption levels for HCl, $Cl_2$, and other halogens or halogen-containing compounds. In addition, none of the aforementioned patents disclose a catalyst which is self-activating and disposable.

SUMMARY

One aspect of one or more embodiments of the present invention provides a catalyst for the oxidation of heavy metals, preferably mercury, in an effluent gas stream.

One embodiment of the invention is the use of a Thief carbon, or partially combusted coal (p.c.c.), catalyst for the oxidation of mercury. Another aspect of one embodiment is a longer useful life for the catalyst(s) which leads to lower long-term costs.

One or more embodiments of the present invention comprise a catalyst for the oxidation of elemental mercury wherein the catalyst is partially combusted coal. In one or more embodiments, the p.c.c. is treated through direct or indirect exposure to a stream containing a halogen, e.g., Cl or Br gas. In another embodiment, the p.c.c. is treated with a halogen-containing substance, including but not limited to aqueous hydrochloric or hydrobromic acid, chlorine gas, liquid bromine, bromine vapor and combinations thereof. In a preferred embodiment, the treated p.c.c. catalyst has a final halogen concentration prior to use between about 0.1 wt. % and 10 wt. %.

In yet another embodiment, the p.c.c. catalyst is between about 20 wt. % and 80 wt. % ash. In one or more embodiments, the surface area of the p.c.c. catalyst is between about 1.0 and 300 $m^2/g$. In another embodiment, the p.c.c. catalyst is effective at oxidizing elemental mercury in a range of temperature between about 37° C. and 400° C.

In one or more embodiments, a method is presented for oxidizing elemental mercury in an effluent stream, comprising: (1) providing an effluent stream comprising elemental mercury, and (2) contacting the effluent stream with one or more embodiments of the p.c.c. catalyst described above.

Still another aspect of the present invention is to provide a carbon-based catalyst with superior mercury oxidation properties. A feature of part of this invention is that Thief carbon, or partially combusted coal (p.c.c.), is used. An advantage of this feature is that the partially combusted coal is easily impregnated with HCl, $Cl_2$, and other halogens and halogen-containing compounds. The HCl and $Cl_2$ aids in the oxidation of Hg to Hg(II), which facilitates easy removal of mercury from an effluent stream. Another aspect is that partially combusted coal is much less expensive than activated carbon and is readily disposable. Yet another aspect of one or more embodiments of the invention is that due to the abundance of p.c.c. regeneration of the catalyst is not essential, thereby reducing costs related to regeneration efforts.

Yet another object of one embodiment of the present invention is to provide mercury oxidation catalysts that are easily activated or self-activating. For example, p.c.c. can be activated via treatment with halogens such as chlorine gas, hydrochloric acid, hydrobromic acid, liquid bromine, bromine vapor, or exposure to a gas stream containing halogens or combinations thereof.

A feature of this invention is that the catalyst is p.c.c. which can be a superior adsorbent of halogens. The adsorption of halogens present in the effluent gas stream enables previously untreated Thief carbon to be an oxidizer of heavy metals such as Cd and Hg. An advantage of this feature is ease of use of the catalyst and thus more cost savings due to the removal of catalyst promotion steps.

Another embodiment of the present invention is a process for oxidizing elemental mercury in an effluent stream using one or more embodiments of the catalyst described above comprising the steps of: providing an effluent stream comprising elemental mercury and contacting the effluent stream with the catalyst, wherein the catalyst oxidizes at least a portion of the elemental mercury in the effluent stream.

These and other features, aspects and advantages of the multiple embodiments of the present invention will become better understood with reference to the following description, tables, and appended claims.

DETAILED DESCRIPTION

The inventors have developed a catalyst for the oxidation of heavy metal contaminants from effluent gas streams. The heavy metals include, but are not limited to, elemental mercury and cadmium. One or more embodiments of the catalyst are also good sorbents for HCl and $Cl_2$ present in effluent gases, which aids in the oxidation of mercury. In addition, the catalyst can be readily regenerable.

One or more embodiments of the invented catalyst has a high oxidation capability for one or more heavy metal contaminants. For example, the catalyst removes cadmium and mercury by oxidizing the Cd and Hg into cadmium (II) and mercury (II) moieties, respectively.

The active component of one or more embodiments of the invented catalyst is partially combusted coal (p.c.c.) or "Thief" Carbon. In one or more embodiments, Thief carbon adsorbs HCl, chlorine or other halogen compounds present in flue gas, thereby serving as a reaction moiety feedstock and reaction surface for the oxidation of entrained elemental Hg. As such, the chlorine moieties serve as a means for promoting the Thief Carbons. The promoted Thief Carbons then are enabled to oxidize many heavy metals, such as Hg, entrained in the effluent. The low cost of Thief carbons make them an attractive oxidation catalyst candidate for Hg in flue gas.

The catalyst can be formed into a solid phase selected from the group of extrudates, powders, pellets, or monoliths to accommodate various reactor configurations, including fluidized bed reactors. Alternatively, the catalyst can also be deployed on a support substrate such as wire mesh or screen configurations. An exemplary constituent of one such configuration is stainless steel, as discussed below.

One or more preferred embodiments of the catalyst can be employed within continuous emission monitor systems (CEM). CEM monitors for mercury often utilize methods to oxidize all of the mercury present within a slipstream of flue gas in order to facilitate the capture and detection of mercury.

Thief Carbon Catalyst Detail

Surprisingly and unexpectedly, the inventors found that partially combusted coal, also known as Thief carbon, is another suitable reaction catalyst for oxidation of elemental metal from flue gas. Generally, the Thief carbons contain between 20 and 80 percent ash by weight.

Thief carbons are produced when coal is withdrawn from a furnace after a brief residence time (approximately 0.1 to 2.5 seconds) near the burner flame. Suitable Thief carbons are those coal remnants containing carbon in concentrations between those found in raw coal and fly ash (completely combusted coal). Preferable ash composition of partially combusted coal (i.e. Thief carbon substrate) is from of about 20 wt. percent ash to 80 wt. percent ash.

Untreated Thief carbons or HCl-treated Thief carbons are employed in a packed bed, monolith, or introduced via injection into a duct upstream of a wet scrubber, ESP, or baghouse in order to facilitate the oxidation and subsequent removal of Hg in coal burning power plants.

Untreated Thief carbons have BET surface areas between about 30 $m^2/g$ to 250 $m^2/g$. Typical particle sizes have diameters which range from of about 35 micrometers ($\mu m$) to 45 $\mu m$. The Thief carbon, or partially combusted coal, is withdrawn from the furnace after a brief residence time on the order of one second. Thief carbons are inexpensive, with an estimated cost of $90 to $250 per ton. The Thief carbon is subsequently treated with halogen, which can be accomplished through three methods.

The first is by gas-phase contact of the Thief carbon with halogens such as chlorine gas ($Cl_2$ (g)), bromine liquid $Br_{2\,(liq)}$, bromine vapor ($Br_{2(gas)}$) and combinations thereof. Further, the carbon could be treated simultaneously with both chlorine and bromine. This method of treatment could be accomplished by a combination of the elements, halogen-containing acids, or via the liquid or gaseous compound bromine chloride (BrCl).

The second manner of treatment of a Thief carbon is by treatment with halogen-containing acids such as hydrochloric acid (HCl (aq)) or hydrobromic acid (HBr(aq)). Treatment with halogen-containing acids is preferred. One method of treatment with a halogen-containing acid entails boiling the Thief carbon in concentrated aqueous HCl (37 wt. percent) to dryness. This gives the Thief carbon catalyst an expected halogen concentration ($Cl_2$) of between about 1 wt. percent to 10 wt. percent.

Preferred surface areas of treated Thief carbon catalysts range from of about 10 $m^2/g$ to 300 $m^2/g$.

As a third method, Thief carbons can be used as catalysts without direct halogen treatment. Instead, the carbons are promoted via exposure to the effluent stream inasmuch as the effluent stream typically contains HCl, $Cl_2$, and/or other halogen containing species. The Thief carbon adsorbs these halogen compounds due to its high surface area and relatively large pore volumes. Hence, the Thief carbons are self-promoting carbon catalysts in effluent gas streams entrained with halogens. First, the Thief carbon is treated with effluent gas for a time sufficient to adsorb halogen to form a promoted catalyst surface. Second, the promoted Thief carbon surface is contacted with the effluent stream for a time sufficient to oxidize the elemental metals contained therein. Third, the now-contacted carbon surface is renewed via desorption of the oxidized metal moieties.

The Thief carbon catalyst can be used in the temperature range of from about 20° C. (68° F.) to 427° C. (800° F.). The preferred temperature range for the Thief carbon catalyst is from about 38° C. (100° F.) to 399° C. (750° F.).

The most desirable operating temperature range is from about 60° C. (140° F.) to 205° C. (400° F.). This temperature range is that typically encountered upstream of air pollution control devices such as an ESP, baghouse filter, or wet or dry scrubber present within coal-burning power plants.

The inventors have also found that the one or more embodiments of the oxidation catalyst are readily regenerable through the application of heat and/or acid. The one-step activation is simple and inexpensive, allowing for considerable cost savings. The invented catalyst is regenerated in an inert atmosphere, such as heating under vacuum, under nitrogen atmosphere, under argon atmosphere, or in an inexpensive oxidizing gas such as air. Concomitant with, or subsequent to the metals desorbing from the catalyst, the metals are removed from the catalytic process by their collection in solutions for subsequent use or disposal. For example, the off-gas from heat treatment of the used catalyst contains mercury. This mercury is collected either through absorption into a solution, or adsorption onto a sorbent.

Another method for restoring the activity of the used catalyst is by washing it with acid (either dilute or concentrated) at ambient or near ambient temperatures. Such acids include, but are not limited to nitric acid, hydrochloric acid, aqua regia, sulfuric acid, and combinations thereof.

The catalyst also may lose effectiveness due to physical build-up of fly ash particles, whereby the particles block reactive/adsorption sites on the surface of the catalyst. Mechanical removal of the fly ash will restore catalyst activity, said mechanical removal effected via actual tapping, ultrasound treatment, or contact of the catalyst with a high velocity, reverse flow gas stream. In the last instance, the high velocity clean-out stream is directed at the catalyst in a direction opposite to the direction the effluent stream flowed upon impingement with the catalyst.

The Thief carbon catalysts are also readily disposable. Spent Thief catalysts can be removed from the flue gas by the plant's particulate collection device (PCD) or by the installation of a dedicated particulate collection device for the catalyst. The Thief carbon catalyst typically is of powder-like consistency, with a mean particle diameter of between approximately 30 and 45 microns.

One or more embodiments of the catalyst of the present invention are further described by reference to the following examples.

Example 1

Flue gas was generated in NETL's 500 lb/hr coal combustor, which is a pulverized coal wall-fired furnace equipped with a water-cooled convection section, a recuperative air heater, spray dryer, baghouse, and associated ancillary equipment. On-line temperature readings, flow measurements, and four separate banks of continuous gas analyzers ($O_2$, $NO_N$, CO, $SO_2$ and $CO_2$) characterize the overall system.

The coal used in this experiment was a mixture of 90% Powder River Basin and 10% eastern bituminous ("90/10"). Table 1 gives the approximate flue gas compositions, measured downstream of the baghouse for 90/10 coal.

TABLE 1

Typical Flue Gas Conditions Downstream of the Baghouse for 90/10 Coal

|  | 90/10 |
| --- | --- |
| $O_2$ (%) | 8.3-9.6 |
| $SO_2$ (ppm) | 225-260 |
| $NO_x$ (ppm) | 320-430 |
| $CO_2$ (%) | 10-11 |
| HCl (ppm) | 6.5 |

While Table 1 does not include mercury concentrations or speciation, it was determined that mercury concentration in the flue gas was typically 5-10 µg $Nm^{-3}$ and 80 to >90% of the mercury was elemental. For some experiments, a mercury spiking system was used to increase the elemental mercury concentration entering the packed bed. The use of the spiking system increased the inlet total mercury concentration to as much as 50 µg $Nm^{-3}$. The mercury concentration and speciation was monitored using a PS Analytical Sir Galahad CEM (continuous emission monitor). Inlet total ($[Hg^{TOT}]_{inlet}$) and elemental ($[Hg^0]_{inlet}$) mercury concentrations were measured by bypassing the packed bed; outlet concentrations were measured at the exit of the packed-bed reactor. The oxidized mercury concentration was calculated as the difference between the total and elemental mercury concentrations.

An 8±1 l/m slip stream of flue gas was extracted downstream of the baghouse and passed through a chiller to remove water. The dehumidified particle-free flue gas was then passed through a packed bed of catalyst. The packed bed reactor was constructed of a vertically oriented 0.5 in. outer diameter by 12 in. long quartz tube. The catalyst material was held in place by glass wool packed into the tube. Tests revealed that the packed wool was inert toward mercury. The quartz tube was surrounded by a clam shell furnace, and the temperature was held at 280° F. (411 K).

Thief carbon is partially combusted coal drawn from the furnace after a short residence time. Thief carbon (or partially combusted coal, p.c.c.) was treated with a halogen by soaking the partially combusted coal in 37% trace-metal grade HCl and drying it on a hot plate to create a p.c.c./HCl catalyst. Table 2 details the experiment conducted with the HCl-treated p.c.c.

TABLE 2

Experimental Conditions

| Catalyst | Coal | T (K) | $[Hg^0]_{inlet}$ µg $Nm^{-3}$ | $[Hg^{TOT}]_{inlet}$ µg $Nm^{-3}$ | Active Catalyst Mass (mg) |
| --- | --- | --- | --- | --- | --- |
| p.c.c./HCl | 90/10 | 411 | 26.3 | 34.8 | 100 |
|  | 90/10 | 411 | 49.6 | 57.9 | 100 |

The p.c.c/HCl catalyst oxidized between about 60-75% of the elemental mercury passing through the packed-bed reactor. In combination with the low cost of partially combusted coal, the effectiveness of this catalyst presents an intriguing option for oxidation of elemental mercury in an effluent gas stream in comparison to other proposed catalysts.

Example 2

A packed bed of 100 mg of HCl-treated high surface area (220 $m^2$/g)

Thief carbon was examined at 280° F. using the same reactor system as in Example 1. A 7.5 liter per minute (l/m) slipstream of particulate-free flue gas generated by NETL's 500 pound per hour (lb/hr) pilot-scale combustion facility was fed through the packed bed reactor at a constant temperature of 280° F. (138° C.). The inlet concentration of total gaseous Hg (elemental plus oxidized mercury) was 10.0 micrograms per normal cubic meter ($\mu g/m^3$), with the concentration of elemental Hg being 8.0 $\mu g/m^3$. After the system had been in operation 6.0 hrs, approximately 75% of the elemental Hg passing through was being oxidized as determined by the same Sir Galahad CEM.

Thief carbon catalysts can be used in a packed bed configuration and held in place with an inert physical support. Pure metal or alloy gauzes, meshes and wools, frits, can be employed as the support. Additionally, when the size of the catalyst or the pressure drop across the catalyst is a concern, the catalyst can be deposited or adhered onto a support material. The configuration can be wools, mesh, gauzes, flakes, filters, wires, monoliths, or a combination of these configurations which render suitable catalytic reaction surfaces and are suitable supports for one or more embodiments of the present invention, including the Thief carbon oxidation catalysts described above.

Certain stainless and carbon steel surfaces can also catalyze the oxidation of elemental mercury present in flue gases. The chlorides and sulfates found on stainless steel surfaces not only directly oxidize elemental mercury, but also provide additional halogen feedstock to Thief carbon sorbents which are supported by stainless steel.

The chlorides and sulfates found on stainless steel surfaces not only directly oxidize elemental mercury, but also provide additional halogen feedstock to Thief carbon sorbents which are supported by stainless steel.

While the invention has been described with reference to details of the illustrated embodiments, these details are not intended to limit the scope of the invention as defined in the appended claims.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

We claim:

1. A catalyst for the oxidation of elemental mercury in an effluent gas stream consisting of an active material comprising partially combusted coal, wherein the partially combusted coal is treated by exposure to one or more halogen-containing substances, and further wherein the partially combusted coal is between about 20 and 80 wt. % ash.

2. The catalyst of claim 1, wherein the halogen-containing substance is an effluent stream entrained with one or more halogens prior to its use.

3. The catalyst of claim 1, wherein the partially combusted coal is treated with a compound selected from the group consisting of chlorine, bromine and combinations thereof.

4. The catalyst of claim 1, wherein the partially combusted coal is treated with hydrochloric acid.

5. The catalyst of claim 1, wherein the partially combusted coal has an initial halogen concentration between about 0.1 wt. % and 10 wt. %.

6. The catalyst of claim 1, wherein the partially combusted coal has a surface area between about 10 and 300 $m^2/g$.

7. The catalyst of claim 1, wherein the partially combusted coal oxidizes elemental mercury in a temperature range between about 20° C. and 427° C.

8. The catalyst of claim 1, wherein the partially combusted coal oxidizes elemental mercury in a temperature range between about 60° C. and 205° C.

9. The catalyst of claim 1, wherein the partially combusted coal has an initial halogen concentration between about 0.1 wt. % and 10 wt. %.

10. The catalyst of claim 9, wherein the partially combusted coal has a surface area between about 10 and 300 $m^2/g$.

11. The catalyst of claim 10, wherein the partially combusted coal oxidizes elemental mercury in a temperature range between about 60° C. and 205° C.

* * * * *